May 8, 1934.　　　　E. L. NEMECHEK　　　　1,957,609
COMBINATION FRUIT JUICE EXTRACTOR AND KITCHEN UTENSIL
Filed July 2, 1930　　　2 Sheets-Sheet 1
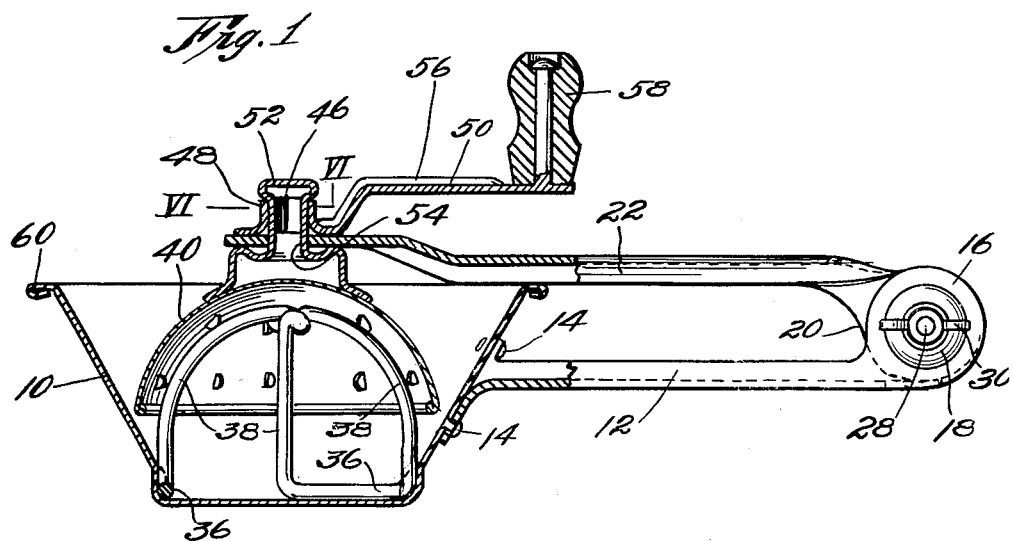
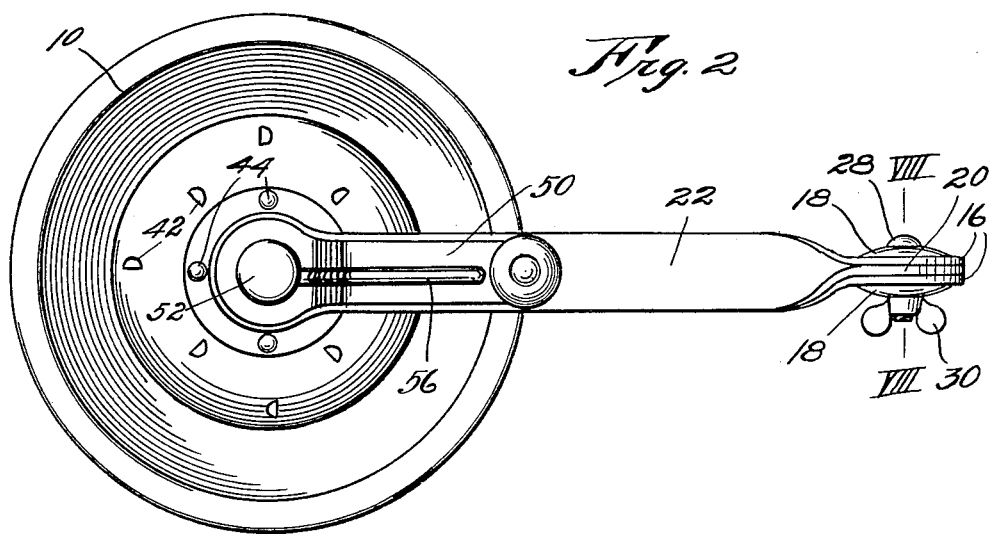
INVENTOR,
Edward L. Nemechek.
BY
Hovey & Hamilton
ATTORNEYS.

May 8, 1934. E. L. NEMECHEK 1,957,609
COMBINATION FRUIT JUICE EXTRACTOR AND KITCHEN UTENSIL
Filed July 2, 1930 2 Sheets-Sheet 2
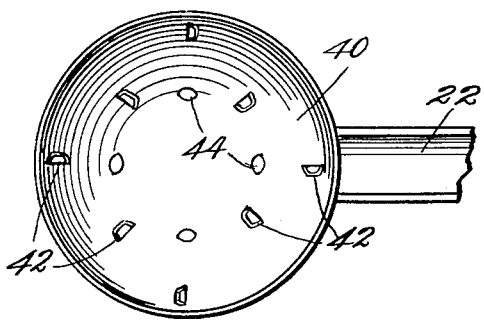
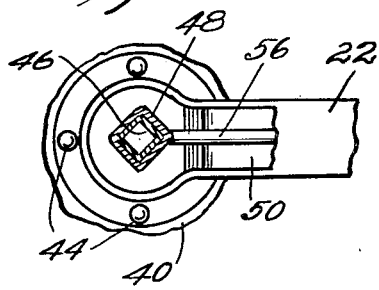
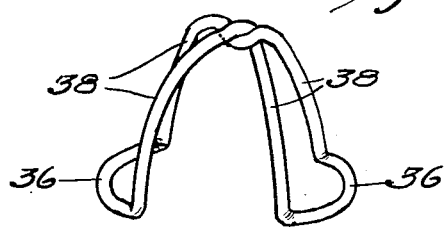
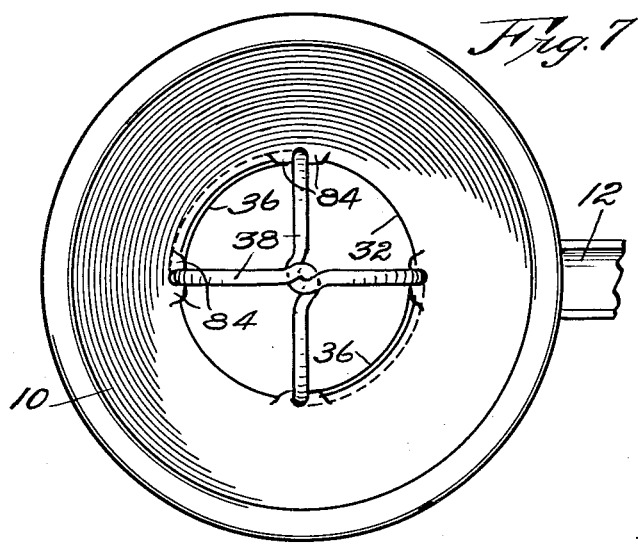
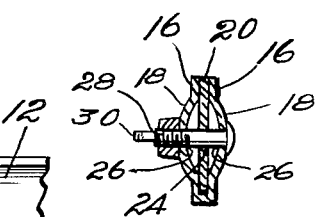
INVENTOR,
Edward L. Nemechek.
BY
Hovey & Hamilton,
ATTORNEYS.

Patented May 8, 1934

1,957,609

UNITED STATES PATENT OFFICE 1,957,609

COMBINATION FRUIT JUICE EXTRACTOR AND KITCHEN UTENSIL

Edward L. Nemechek, Kansas City, Mo.

Application July 2, 1930, Serial No. 465,358

2 Claims. (Cl. 146—3)

This invention relates to fruit juice extractors and more particularly to a combined fruit juice extractor and cooking utensil which is constructed in an extremely efficient manner with respect to its simplicity of design and cost of manufacture and the primary object of this invention is to provide such a utensil wherein is embodied a novel combination of parts which when used for the purpose set forth, will be thorough in its operation and extremely easy to manipulate.

Another object of this invention is the provision of a fruit juice extractor which embodies parts that are easily manufactured, quickly assembled and which renders the utensil easy to keep clean when in actual use.

A further object of this invention is to provide a fruit juice extractor having articulated handle and support arms, the attaching member of which may be removed to disassemble the device so that the juice receiving receptacle of the device may be used as a pan or similar cooking utensil.

A yet further object of the invention is the contemplation of a fruit juice extractor having a comminutor which is removably supported within the pan of the extractor in a manner which permits quick removal and at the same time precludes displacement of the comminutor during the operation of the fruit juicer.

Details of construction and specific combination of parts will appear during the course of the following specification, having reference to the accompanying drawings, wherein Figure 1 is a vertical central section through the combination fruit juice extractor and kitchen utensil made in accordance with this invention.

Fig. 2 is a top plan view of the same.

Fig. 3 is an inverted plan view of the fruit engaging shell alone.

Fig. 4 is an enlarged detail fragmentary sectional view taken through one of the fruit engaging lugs formed by the shell.

Fig. 5 is a perspective view of the comminutor entirely removed from the juice extracting device.

Fig. 6 is a fragmentary horizontal section taken on line VI—VI of Fig. 1.

Fig. 7 is a top plan view of the pan and comminutor of the juice extractor, and, Fig. 8 is a cross section through the pivotal connection between arm and handle taken on line VIII—VIII of Fig. 2.

With particular reference at this time to the specific details of construction and the novel combination of parts shown in the acompanying drawings, wherein but the preferred form of the invention has been illustrated, the numeral 10 indicates a juice receiving pan which is preferably formed of aluminum or sheet metal in a manner to have the sides thereof converging as the bottom of the pan 10 is approached. This pan 10 may be made of any suitable size and should have a handle 12 rigidly secured thereto by rivets or analogous means 14. As illustrated in the drawings, handle 12 should be formed of sheet metal and should have its end remote from pan 10 turned upwardly to form a pair of ears 16, each of which is bulged as at 18 to receive the end 20 of a support arm 22, which in turn carries the hereinafter described parts of the juice extractor. Lug 20 and each of ears 16 are provided with registering openings 24 and 26 respectively to receive a bolt or similar member 28 which pivotally joins support arm 22 and handle 12. A thumb nut 30 is provided upon bolt 28 which permits tightening the support arm between ears 16 so that the arm may be secured in any predetermined position throughout its path of travel. Obviously, the bolt 28 may be entirely removed and the parts secured to the handle 12 thereby disassociated from the pan 10 so that the same may be used simply as an ordinary cooking utensil.

The purpose of this fruit juicer is effectively carried out through the use of a specially constructed comminutor which is removably secured within pan 10 and against rotation with the fruit, by the use of the annular groove 32 which is formed at the juncture of the sides and bottom of pan 10. A series of inwardly pressed shoulders 84 engage a portion of the comminutor and after it is snapped into position the same is not readily displaced as the fruit juicer is being operated. Reference to Fig. 5 of the drawings will indicate the preferred way of making this comminutor. The same is preferably formed of a continuous piece of rod or wire which is bent to form two arcuate base portions 36 joined by the vertical arches 38 which are interlocked at the top of the arch as shown. The radius of the arcuate base members 36 is substantially the same as the radius of the groove 32 formed at the juncture of the side and bottom of pan 10 and when the base members 36 are forced together, they will assume a position which allows them to be placed in the pan as shown in Fig. 1. Arches 38 pass upwardly between shoulders 34 and rotation on the part of the comminutor in either direction is precluded. It is understood that comminutors of various sizes may be positioned in the pan 10 to receive citrous fruits from which the juice is to be extracted. Any number of vertical arches might be used without departing from the spirit of the invention.

It is understood that when the fruit to be acted upon is cut it is forced over the comminutor and the same is then engaged by the shell 40 which may have a cross sectional contour substantially the same as the arc formed by the vertical arches 38. Blunt lugs 42 may be formed by pressing inwardly small sections of the shell 40 and in the case of heavier fruits these lugs 42 will pierce the same to move the fruit over the arches 38 of the comminutor.

In the operation of fruit juice extractors of this type it is desirable to have the fruit engaging shell 40 progressively movable toward the comminutor as the cells of the fruit are broken up and removed from the rind by rotation over the comminutor. Accordingly, and as hereinbefore described, the outer ends of arm 22 and handle 12 are articulated. The inner end of arm 22 supports shell 40 through the intermediacy of a bearing which is formed up of a stamping and riveted to the shell 40 as at 44. A portion of the neck of the bearing is squared as at 46 to receive the squared hub 48 of an operating crank 50. This crank 50 is pressed upon the squared portion 46 after which the top of the bearing is forced down against the hub 48 to form a head 52 which keeps the parts engaging the bearing from becoming relatively displaced. An opening 54 formed through the support arm 22 engages the bearing below the squared portion 46 and supports shell 40 in a manner to permit rotation of the same through the use of the operating crank 50. A strengthening rib 56 may be embossed in the crank 50 to lend rigidity and a knob 58 may be supplied to afford a convenient grasp for the hand of the operator.

It is notable that all of the parts forming this novel juice extractor are made up of sheet metal which insures cheapness and ease of manufacture. The few exceptions, such as the comminutor, may be formed through the use of suitable fixtures and it is obvious that a juice extractor made in accordance with this invention will be simple in construction, as well as effective in operation. In the case of arm 22 and handle 12, side members are formed which lend strength and beads 60 and 62 may be rolled upon the lips of the pan and shell 10 and 40 respectively.

The quick removal of the comminutor from the pan 10 is permitted when the novel construction herein described is utilized.

In constructing a fruit juicer in accordance with this invention it is desirable to eliminate as many parts as possible, both for the purpose of cheapening the cost of manufacture and for the purpose of creating a utensil which is not complicated and which is simpler to assemble. It is known that the use of a large number of rivets or similar assembling units are objectionable and accordingly this invention contemplates the design of handle 12 and support arm 22 as shown in the drawings. In the case of support arm 22, the same is continuous from one end where the hinged portion is formed to the other end where the bearing engages the opening 54 formed therethrough. The joining together of handle 12 and arm 22 at their outer ends is accomplished by merely forming the two mentioned members in the proper fashion. There are no additional parts with the exception of the bolt 28 hereinbefore described. While the preferred form of the invention contemplates the use of pressed in shoulders 34, it is obvious that the annular groove 32 may be formed a distance around the bottom of pan 10 which is exactly coextensive with the arcuate base members 36 of the comminutor. The ends of these shorter arcuate grooves would thereby abut the ends of base portions 36 where the vertical arches join the same and serve as a means for precluding rotary motion in either direction with respect to pan 10.

It is understood that many modifications in the structural details of the fruit juicer might be made without departing from the spirit of the instant invention and, having thus described the same, what I claim and desire to secure by Letters Patent is:

1. In a fruit juice extractor, a pan having converging sides, a comminutor fitted into said pan, a fruit engaging shell movable to and from a position over said comminutor and means formed by said pan at the bottom thereof to removably secure said comminutor in place and to preclude turning of said comminutor including an annular groove to receive a portion of said comminutor and a plurality of inwardly pressed lugs disposed to engage a member of the comminutor.

2. In a fruit juice extractor, a pan, a series of holding grooves formed at the juncture of the pan bottom and sides and a comminutor, said comminutor being formed of a continuous piece of wire to present a pair of base members joined by a plurality of vertical arches, said arches being flexible whereby to move said base members to a position whereby the same may be positioned in said holding grooves formed by said pan.

EDWARD L. NEMECHEK.